No. 750,931. PATENTED FEB. 2, 1904.
H. R. ASHBY.
HOSE COUPLING.
APPLICATION FILED MAY 13, 1903.
NO MODEL.

Witnesses:

Inventor
H. R. Ashby,
By   Attorneys

No. 750,931. Patented February 2, 1904.

UNITED STATES PATENT OFFICE.

HUGH R. ASHBY, OF MUSTARD, PENNSYLVANIA.

HOSE-COUPLING.

SPECIFICATION forming part of Letters Patent No. 750,931, dated February 2, 1904.

Application filed May 13, 1903. Serial No. 156,938. (No model.)

*To all whom it may concern:*

Be it known that I, HUGH R. ASHBY, a citizen of the United States of America, residing at Mustard, in the county of Allegheny and State of Pennsylvania, have invented certain new and useful Improvements in Hose-Couplings, of which the following is a specification, reference being had therein to the accompanying drawings.

This invention relates to certain new and useful improvements in hose-couplers, and has for its object to provide a hose-coupler which can be easily, quickly, and effectively coupled without the use of the ordinary screw-threads now generally used.

Another object of my invention is to provide means carried by said hose-coupler whereby the sections or members comprising my hose-coupler can be quickly locked together, said means being accessible when it is desired to unlock the same.

Briefly described, my invention consists of a male and female member, said male member carrying a tubular extension which fits into the annular recess carried by the female member. Upon the periphery of my improved hose-coupler I provide a plurality of triangular telescopic casings, which carry the locking means for securing the two members or sections together.

In describing the invention in detail reference is had to the accompanying drawings, forming a part of this specification, and wherein like numerals of reference indicate like parts throughout the several views, in which—

Figure 1:
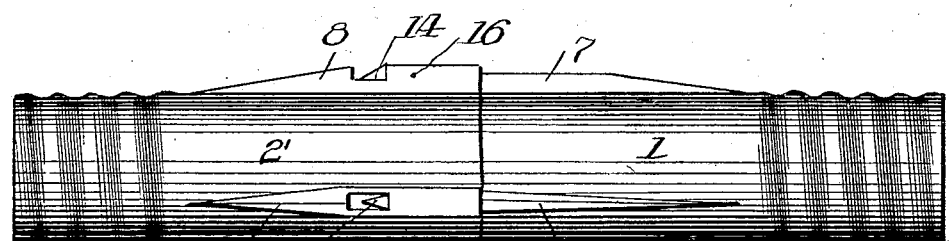
Figure 2:
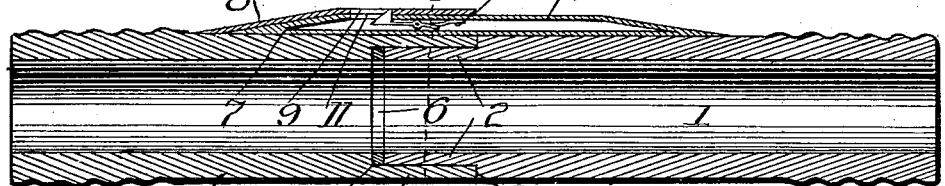
Figure 3:
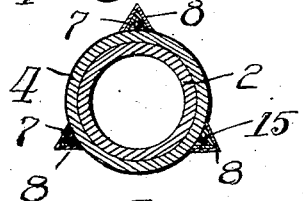
Figures 4, 5, 6:
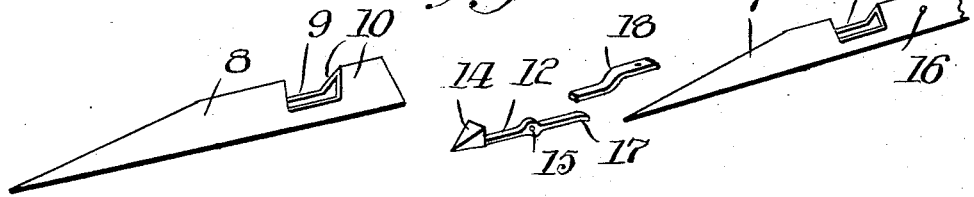

Figure 1 is a side elevation of my improved hose-coupler. Fig. 2 is a longitudinal sectional view of the same. Fig. 3 is a cross-section taken on the line 2 2 of Fig. 2. Fig. 4 is a detail perspective view of the receiving telescopic casing. Fig. 5 is a detail perspective view of the locking means. Fig. 6 is a detail perspective view of one of the telescopic casings which carry the locking means illustrated in Fig. 5.

To put my invention into practice, I provide a male and female member, said male member 1 carrying a tubular extension 2, said tubular extension being of a smaller diameter than the body portion of the male member, thus presenting the annular shoulder 3, against which abuts or rests the annular collar 4, formed by the recess 5, carried by the female member 2'. This recess 5 receives the tubular extension 2 of the male member 1, and in said recess I provide a rubber or other suitable gasket, as indicated by the reference-numeral 6. Upon the periphery of the male and female members I provide a plurality of telescopic casings, in which are placed the locking means for securing the two members or sections together. These telescopic casings are preferably triangular in form and are secured to the periphery of said members by any suitable means. These triangular casings constitute a male casing 7 and a female casing 8, said female casing having a cut-away portion 9 formed in the angular sides 10. A similar cut-away portion 11 is provided in the male member 7, and when said male member is seated in the female member, as illustrated in Fig. 2, these apertures or openings register. Within the casing of the male member I provide locking means, (illustrated in Fig. 5,) which consists of a lever 12, carrying a triangular head 14, and intermediate of said lever 12 is an enlarged portion 15, which is pivoted in the triangular casing of the male member 7, as at 16, and engaging the upper face of the lever 12 is a spring 17, which is secured in the apex of the casing 7, as indicated at 18.

The manner of coupling my improved hose-coupler is as follows: It being desired to couple the two members together the tubular extension or projection 2 is inserted in the recess formed in the female member 2' and the male member 1 is revolved until the male casing 7 is in alinement with the female casing 8. When the same is forced forward, the triangular head 14 of the locking device will be depressed, while the same impinges in the apex of the female section, said head remaining in this position until the apertures 9 and 11 register, when said triangular head will be forced outwardly by the spring 18, the shoulder formed by said triangular head catching in the aperture 9, carried in the female casing 8, thus firmly locking the two members together. When it is desired to unlock the same, the triangular heads 14 are depressed and the male member 1 is withdrawn from the female member or section 2'.

While I have herein shown and described a plurality of telescopic casings carrying locking means, it is obvious that I may employ any number of said casings, and it will be noted that various other slight changes may be made in the details of construction without departing from the general spirit of my invention.

Having fully described my invention, what I claim as new, and desire to secure by Letters Patent, is—

1. A hose-coupler comprising a male and a female member, a tubular projection carried by the male member and fitting into the recess carried by the female member, telescopic casings comprising a male and a female member secured to the periphery of said male and female member, said casings being triangular in form and having apertures formed in the apex of said triangular casings, locking means carried by the male casings, said locking means engaging the apertures formed in the female casing when the same are in the locked position, substantially as described.

2. A hose-coupler comprising a male and female member, a tubular extension carried by the male member and engaging in the recess carried by the female member, a gasket interposed therebetween, a plurality of telescopic casings, said casings being triangular in form and having apertures formed in the apex of said casings, locking means carried by the male casing and engaging the apertures formed in the female casing, said locking means being automatic, substantially as described.

In testimony whereof I affix my signature in the presence of two witnesses.

HUGH R. ASHBY.

Witnesses:
R. R. ELLIS,
WM. H. WOODS.